US009285248B2

(12) United States Patent
Messenger et al.

(10) Patent No.: US 9,285,248 B2
(45) Date of Patent: Mar. 15, 2016

(54) MICROELECTRONIC DISPLACEMENT DAMAGE DOSE DETECTOR

(71) Applicants: Scott R. Messenger, Baltimore, MD (US); Cory D. Cress, Alexandria, VA (US); Michael K. Yakes, Alexandria, VA (US); Jeffrey H. Warner, Baltimore, MD (US); Robert J. Walters, Alexandria, VA (US)

(72) Inventors: Scott R. Messenger, Baltimore, MD (US); Cory D. Cress, Alexandria, VA (US); Michael K. Yakes, Alexandria, VA (US); Jeffrey H. Warner, Baltimore, MD (US); Robert J. Walters, Alexandria, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 18 days.

(21) Appl. No.: 14/205,187

(22) Filed: Mar. 11, 2014

(65) Prior Publication Data
US 2014/0312239 A1 Oct. 23, 2014

Related U.S. Application Data

(60) Provisional application No. 61/786,700, filed on Mar. 15, 2013, provisional application No. 61/775,914, filed on Mar. 11, 2013.

(51) Int. Cl.
*G01T 1/02* (2006.01)
*G01D 9/00* (2006.01)

(52) U.S. Cl.
CPC ............... *G01D 9/005* (2013.01); *G01T 1/026* (2013.01)

(58) Field of Classification Search
CPC ................................ G01D 9/005; G01T 1/026
USPC ..................... 250/370.07, 336.1, 395
See application file for complete search history.

(56) References Cited

U.S. PATENT DOCUMENTS

2002/0182801 A1* 12/2002 Shimazaki et al. ........... 438/234

OTHER PUBLICATIONS

Messenger, S.R., Jackson, E.M. ; Warner, J.H. ; Walters, R.J., et al., "Correlation of Telemetered Solar Array Data With Particle Detector Data On GPS Spacecraft," IEEE Trans. Nucl. Sci 58, p. 3118-3125, Dec. 2011.
Dichter, B.K., ; McGarity, J.O. ; Oberhardt, M.R. ; Jordanov, V.T., et al., "Compact Environmental Anomaly Sensor (CEASE): A Novel Spacecraft Instrument for In Situ Measurements of Environmental Conditions," IEEE Trans. Nucl. Sci. 45(6), p. 2758-2764, Dec. 1998.
(Continued)

*Primary Examiner* — Yara B Green
*Assistant Examiner* — Abra Fein
(74) *Attorney, Agent, or Firm* — US Naval Research Laboratory; Kerry L. Broome

(57) ABSTRACT

A device is described that includes sensors that are sensitive to displacement damage, and can be configured to display a characteristic damage curve. The sensors, or diodes, can be made of one or more semiconductor materials that are sensitive to displacement damage, and can be operated in dark illumination conditions. The sensors can have multiple shields of a specific or varied thickness. The shields can be formed in different configurations, though the shielding thickness can be designed to change the level of displacement damage absorbed by the sensors. The characteristic damage curve can provide a sensor response variable that displays a functional dependence on displacement damage. For example, the characteristic damage curve can provide a sensor response variable that is one or more currents measured at one or more fixed voltages, or one or more voltages measured at one or more fixed currents.

18 Claims, 9 Drawing Sheets

(56) References Cited

OTHER PUBLICATIONS

Jenkins, P., Krasowski, M. ; Prokop, N. ; Walters, R., et al., "TACSAT-4 solar cell experiment: Advanced solar cell technologies in a high radiation environment," Proc. 34th IEEE Photovoltaic Specialists Conf., p. 9-12, Jun. 2009.

Messenger, S.R., Jackson, E.M. ; Warner, J.H. ; Walters, R.J., et al., "SCREAM: A New Code for Solar Cell Degradation Prediction Using the Displacement Damage Dose Approach," Proc. 35th IEEE Photovoltaic Specialists Conference, Honolulu, HI, pp. 1106-1111, Jun. 2010.

Reeves, G., O'Brien, P., Mazur, J., Ginet, G.," Targeted and Comprehensive SpaceEnvironment Sensors: Description and Recommendations," Los Alamos National Laboratory, LA-14381, Jan. 2009.

Summers, G.P., Burke, E. A., Xapsos, M. A., "Displacement Damage Analogs to Ionizing Radiation Effects," Radiation Measurements 24(1), pp. 1-8, Jan. 1995.

Messenger, S.R., Summers. G. P., Burke, E.A., Walters, R.J., Xapsos, M.A., "Modeling solar cell degradation in space: A comparison of the NRL displacement damage dose and the JPL equivalent fluence Approaches," Prog. Photovolt.:Res. And Appl. 9(2), pp. 103-121, Mar./Apr. 2001.

Walters, R. J., Messenger, S.R. ; Summers, G.P. ; Burke, E.A., et al., "Correlation of Proton Radiation Damage in InGaAs—GaAs Quantum Well Light-Emitting Diodes," IEEE Trans. Nucl. Sci. 48(6), pp. 1773-1777, Dec. 2001.

Warner, J. H., Walters, R.J. ; Messenger, S.R. ; Summers, G.P., et al., "High-energy proton irradiation effects in GaAs devices," IEEE Trans. Nucl. Sci. 51(5), pp. 2887-2895, Oct. 2004.

Messenger, S.R., Warner, J.H. ; Uribe, R. ; Walters, R.J., "Monte Carlo Analyses of the NEO Beam Electron Beam Facility for Space Solar Cell Radiation Qualification," IEEE Trans. Nucl. Sci. 57(6), pp. 3470-3476, Dec. 2010.

Houdayer, A. J., Hinrichsen, P.F., Barry, A.L., Ng, A., "GaAs LED Based NIEL Spectrometer for the Space Radiation Environment," IEEE Trans. Nucl. Sci. 47(3), pp. 533-538, Sep. 1999.

Rosenfeld, A. B., Yudelev, M. ; Lerch, M.L.F. ; Cornelius, I., et al., "Neutron Dosimetry With Planar Silicon p-i-n Diodes," IEEE Trans. Nucl. Sci. 50(6), pp. 2367-2372, Dec. 2003.

Vaillé, J. R., et al., "Online dosimetry based on optically stimulated luminescence materials," IEEE Trans. Nucl. Sci., 52(6), pp. 2578-2582, Dec. 2005.

Deneau, C., et al., "First In-Flight Data Analysis of Displacement Damage on the OSL Sensor On-Board CARMEN-2," IEEE Trans. Nucl. Sci., 58(3), pp. 939-944, Jun. 2011.

\* cited by examiner

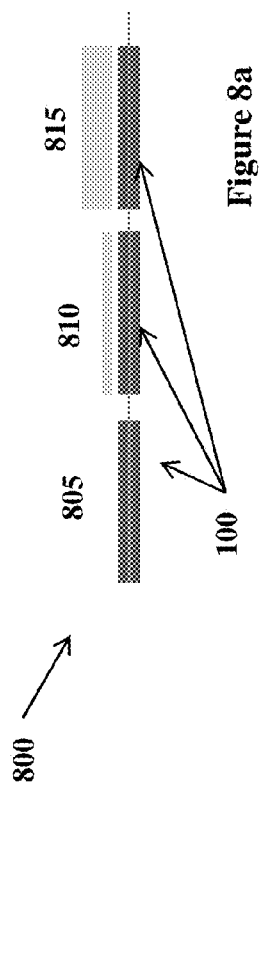
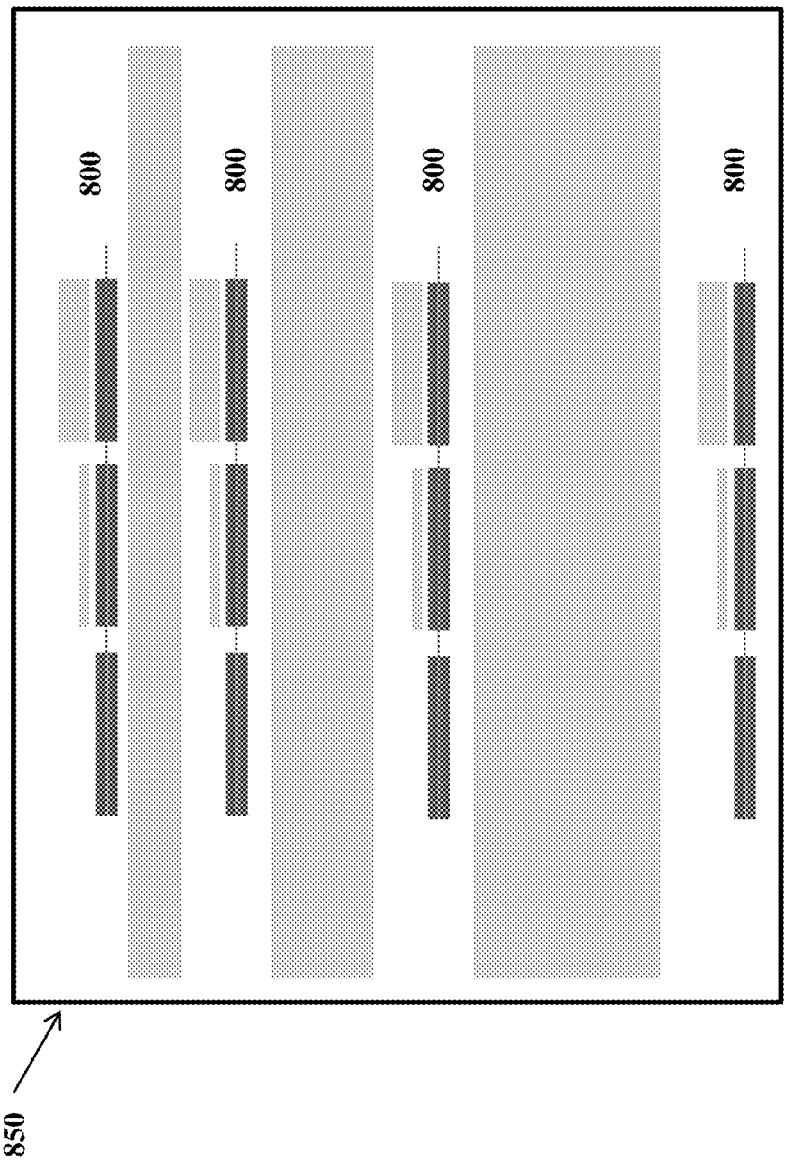

MICROELECTRONIC DISPLACEMENT DAMAGE DOSE DETECTOR

CROSS-REFERENCE TO RELATED APPLICATIONS

This application claims priority to provisional patent application entitled, "A MICROELECTRONIC DISPLACEMENT DAMAGE DOSE DETECTOR," filed on Mar. 11, 2013, and assigned U.S. Application No. 61/775,914; and to provisional patent application entitled "AN ELECTRONIC DISPLACEMENT DAMAGE DOSE DETECTOR," filed on Mar. 15, 2013, and assigned U.S. Application No. 61/786,700. The entire contents of both applications are hereby incorporated by reference.

FIELD OF THE INVENTION

The present disclosure relates generally to measuring the effects of radiation on components, such as spacecraft components. More specifically, it relates to a microelectronic device that can be used to accurately and simply quantify displacement damage dose directly, with applications in both ground-based and space-based radiation environment displacement damage dosimetry.

BACKGROUND

A satellite flying in Earth orbit is subjected to a particle (electron and proton) radiation environment, the severity being dependent on the orbit. This exposure to radiation has always been an issue for satellites. Standard integrated circuits can gradually degrade or even catastrophically fail when exposed to the space radiation environment thereby necessitating special radiation-hardened components for satellites. Radiation remains one of the leading causes of satellite anomalies; and as technology advances, the risk increases.

Throughout the years, the radiation effects community has developed models and devices to measure the effects of radiation on spacecraft components. Most commonly, the effects encountered in space radiation environments on materials and components are quantified using ground-based radiation testing. Depending on particle type and energy, the effects from space radiation interacting with a spacecraft or its systems can be classified into three main groups:

1. Single Event Effects (SEE): Single interactions, either large ionization or a nuclear reaction, that can give temporary or permanent damage to a given detector or system. SEE effects are important for digital circuits such as memories or microprocessor by inducing errors, undesired latch-ups and may lead to system failure.

2. Total Ionization Dose (TID): Effects caused by long-term exposure to ionizing radiation. TID may induce changes in the mechanical and electrical properties of materials, causing them to operate incorrectly or even fail. TID effects are important for insulators, cabling, CMOS circuits (due to charge build-up), optical elements and cryogenics.

3. Displacement Damage (commonly called Non-Ionizing Energy Loss (NIEL) damage): Displacement damage caused by long-term exposure to particle radiation such as neutrons, protons, heavy ions, and electrons. Some energetic particles can originate displacement defects in semiconductor materials, such as silicon sensors and solar cells, leading to introduction of deep band-gap levels with corresponding increase of noise and decrease of efficiency. Displacement damage effects are important for semiconductor devices, such as optical sensors, laser diodes, optocouplers, bipolar transistors, and solar cells.

Spacecraft charging is also a very important effect but is often mitigated through proper spacecraft design. Each of these main groups has established specific ground-based radiation testing methods to fully quantify the radiation survivability of materials and microelectronic devices; however, the options for quantifying displacement damage effects are limited.

Ionizing dose can be calculated by combining the particle fluence with the ionizing stopping power (or linear energy threshold, LET) of a given material. In an analogous manner, the displacement damage dose (DDD, in units of MeV/g) can be determined by combining the particle fluence and the nonionizing energy loss (NIEL), which is the rate at which atomic displacements are produced in a material from recoiling atoms caused by primary radiation particles such as electrons and protons. The NIEL calculation typically involves knowledge of the differential scattering cross for atomic displacements, the recoiling atom kinematics, and a term called the Lindhard partition factor, which separates out the nonionizing and ionizing energy loss components of the recoiling atom. There are primarily two physical interactions contributing to the total NIEL: 1) screened Coulombic and 2) nuclear. The nuclear component only becomes important for positive atoms having energies >10 MeV/AMU.

Displacement damage dose has been shown to be very effective in correlating the effects of differing energetic particles on the performance of several devices. As an example, consider electron and proton radiation effects on solar cells. To fully qualify a solar cell for space application, the heritage model developed by the California Institute of Technology/Jet Propulsion Laboratory (JPL) requires ground irradiation testing to be performed at several electron and proton energies. The testing provides ground based irradiation results performed on single junction GaAs solar cells where the degradation of the maximum power (Pmax) under 1 sun, AM0 (25° C.) illumination conditions can be plotted as a function of particle fluence (# particles/cm2) for several electron and proton energies. In the JPL model, these data can be used to generate a set of relative damage coefficients (RDCs) from which the degradation performance can be predicted behind different shielding levels from both proton and electron energy spectra. This method can be used to properly size and/or shield (with coverglass) the solar array to meet mission end-of-life (EOL) requirements. This "heritage" approach is rigorously correct but requires a significant amount of ground-based irradiation data and can be very costly and time consuming.

Accordingly, a need remains in the art for a microelectronic device that can be used to accurately and simply quantify displacement damage dose directly.

SUMMARY OF THE INVENTION

According to one aspect of the invention, a device is described that includes sensors that are sensitive to displacement damage, and can be configured to display a characteristic damage curve. The sensors, or diodes, can be made of one or more semiconductor materials that are sensitive to displacement damage, and can be operated in dark illumination conditions. The sensors can have multiple shields of a specific or varied thickness. The shields can be formed in different configurations, though the shielding thickness can be designed to change the level of displacement damage absorbed by the sensors. The characteristic damage curve can provide a sensor response variable that displays a functional dependence on displacement damage. For example, the characteristic damage curve can provide a sensor response variable that is one or more currents measured at one or more fixed voltages, or one or more voltages measured at one or more fixed currents. Furthermore, the configuration of the one or more sensors of the device can be configured to determine the energy spectrum of the radiation environment.

According to another aspect of the invention, a method is described for determining a displacement damage dose of the device based on a characteristic curve of a device. The characteristic curve for the device can be established for performing ground-based radiation tests. The characteristic curve can be plotted on a graph with current in units of Amperes on a Y-axis, and displacement damage dose in units of MeV/g on an X-axis. The displacement damage dose of the device can be determined by measuring a current at a fixed forward biased voltage on the characteristic curve. Alternatively, the displacement damage dose of the device can be determined by measuring a voltage at a fixed current on the characteristic curve.

These and other aspects, objects, and features of the present invention will become apparent from the following detailed description of the exemplary embodiments, read in conjunction with, and reference to, the accompanying drawings.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, in which:

FIG. 8a is a structural diagram of a device array, in accordance with an exemplary embodiment of the invention.

FIG. 8b is a structural diagram of a stacked device array, in accordance with an exemplary embodiment of the invention.

DETAILED DESCRIPTION OF EXEMPLARY EMBODIMENTS

Figure 1:
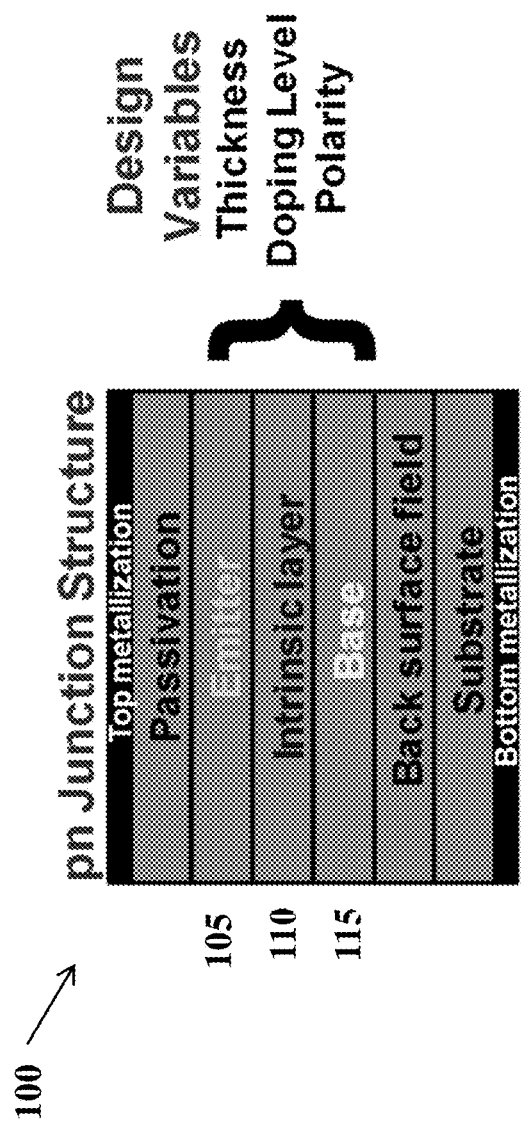
FIG. 1 is a structural diagram of a displacement damage dose sensor, in accordance with an exemplary embodiment of the invention.

One or more embodiments or implementations are hereinafter described in conjunction with the drawings, where like reference numerals refer to like elements throughout, and where the various features are not necessarily drawn to scale.

Similarly, to the JPL model discussed above, the Naval Research Laboratory (NRL) developed a technique to predict on-orbit performance based on displacement damage dose with the results comparing well to the JPL model. The NRL model demonstrated that, using the calculated nonionizing energy loss (NIEL) to correlate displacement damage radiation effects due to different energetic particles, ground-based radiation data can be reduced to two, characteristic radiation degradation, or damage, curves. One of the curves can be for proton and neutron damage, and the other one can be for equivalent 1 MeV electrons. The NRL model implied that the characteristic curves could be obtained using much less ground testing; thereby saving significant time and money in the space qualification process. More specifically, the NRL model provided results that show how the generation of the characteristic radiation degradation curve for the metric of interest can be generated using conveniently chosen ground test radiation particles so long that they traverse through the active area of the device with uniform DD deposition.

For many III-V based devices, protons on the order of a few MeV can be satisfactory to meet this requirement. The simplicity of characteristic curve generation can have important implications for future space cell qualification and requalification of existing ones, as characterizing a new technology (often having many design iterations to make the device as radiation hard as possible) can now be done with a minimum of ground test data. Furthermore, the method is readily applicable to modeling other devices that display displacement damage sensitivity. All that is needed is the generation of the characteristic degradation curve of interest for that particular device.

FIG. 1 is a structural diagram of a sensor 100, or microelectronic displacement damage dose sensor, in accordance with an exemplary embodiment of the invention. For the example, the sensor 100 can be a junction diode, such as a GaAs pn junction diode, and can be used in dark illumination conditions. Current-voltage (IV) measurements in the dark can be used to understand and correlate the radiation effects.

In an exemplary embodiment of the invention, the sensor 100, or GaAs pn junction structure, can be grown using molecular beam epitaxy (MBE), or another technique such as metal organic chemical vapor deposition (MOCVD), on GaAs substrates. One of ordinary skill in the art will understand that there are several layers of semiconductor material in a pn junction, which can be varied to change the radiation response characteristics of the sensor 100. However, there are at least three main active layers in a pn junction: 1) emitter 105, 2) intrinsic layer 110, or depletion region, and 3) base 115. In each of these layers, there are four controls that can affect both the sensor 100 performance and radiation response: 1) dopant species, 2) doping level (carrier concentration), 3) polarity (i.e. n- or p-type) and 4) thickness. The parameters that are typically affected by radiation, namely the minority carrier diffusion lengths and dark currents, can be heavily dependent on these controls. Therefore, one of ordinary skill in the art would understand that through proper design and radiation testing, the sensor 100 could be optimized to survive in however harsh the radiation environment is expected to occur on orbit. Both radiation hard and radiation soft designs can be designed to maximize the sensitivity of the sensor 100 over a large range of radiation levels and/or shielding configurations.

The behavior of the current (I) of a pn junction diode under an applied voltage (V) can be governed by the "diode equation" given by the expression $$I(V) = I_{01}\left[\exp\left(\frac{qV}{kT}\right) - 1\right] + I_{02}\left[\exp\left(\frac{qV}{2kT}\right) - 1\right],$$

where the constants $I_{01}$ and $I_{02}$ are commonly referred to as the diffusion and recombination coefficients, respectively, q is the electronic charge, k is Boltzmann's constant, and T is temperature. Forward and reverse biased dark IV (DIV) curves can be generated with the applied voltage being positive or negative, respectively. Depending on the magnitudes of $I_{01}$ and $I_{02}$, the shape of the dark currents can change appreciably, deeming a given pn junction diode structure as being diffusion or recombination dominated.

Figure 2:
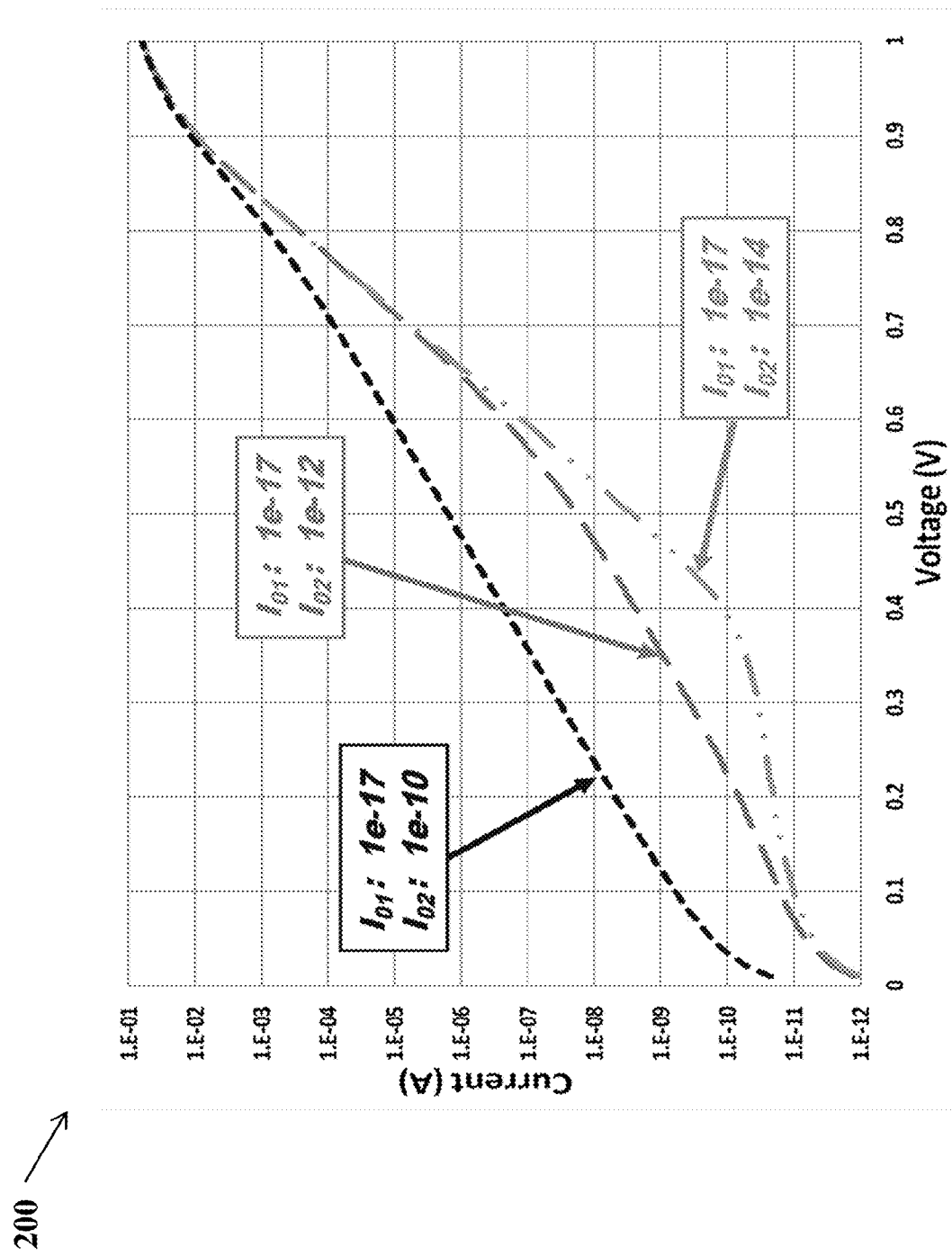
FIG. 2 is a graph representing a forward-biased pn junction DIV behavior with different diffusion and recombination contributions, in accordance with an exemplary embodiment of the invention.

FIG. 2 is a graph 200 representing a forward-biased pn junction DIV behavior with different diffusion and recombination contributions, in accordance with an exemplary embodiment of the invention. FIG. 2 gives examples of DIV behavior where the recombination term ($I_{02}$) is increased from $10^{-14}$ to $10^{-10}$ with the diffusion term ($I_{01}$) constant at $10^{-17}$. The characteristic behavior dominating each effect by the slope of the DIV curve can be seen. A slope of 1 or 2 can denote diffusion of recombination domination, respectively. The low voltage tail on the bottom curve can be due to shunt resistance effects. In practice, the sensor 100 growth schematics, as represented in FIG. 1, can be designed to make it diffusion or recombination dominant. The reverse biased DIV behaviors have similar features, which can also be exploited to understand the radiation effects.

Figure 3:
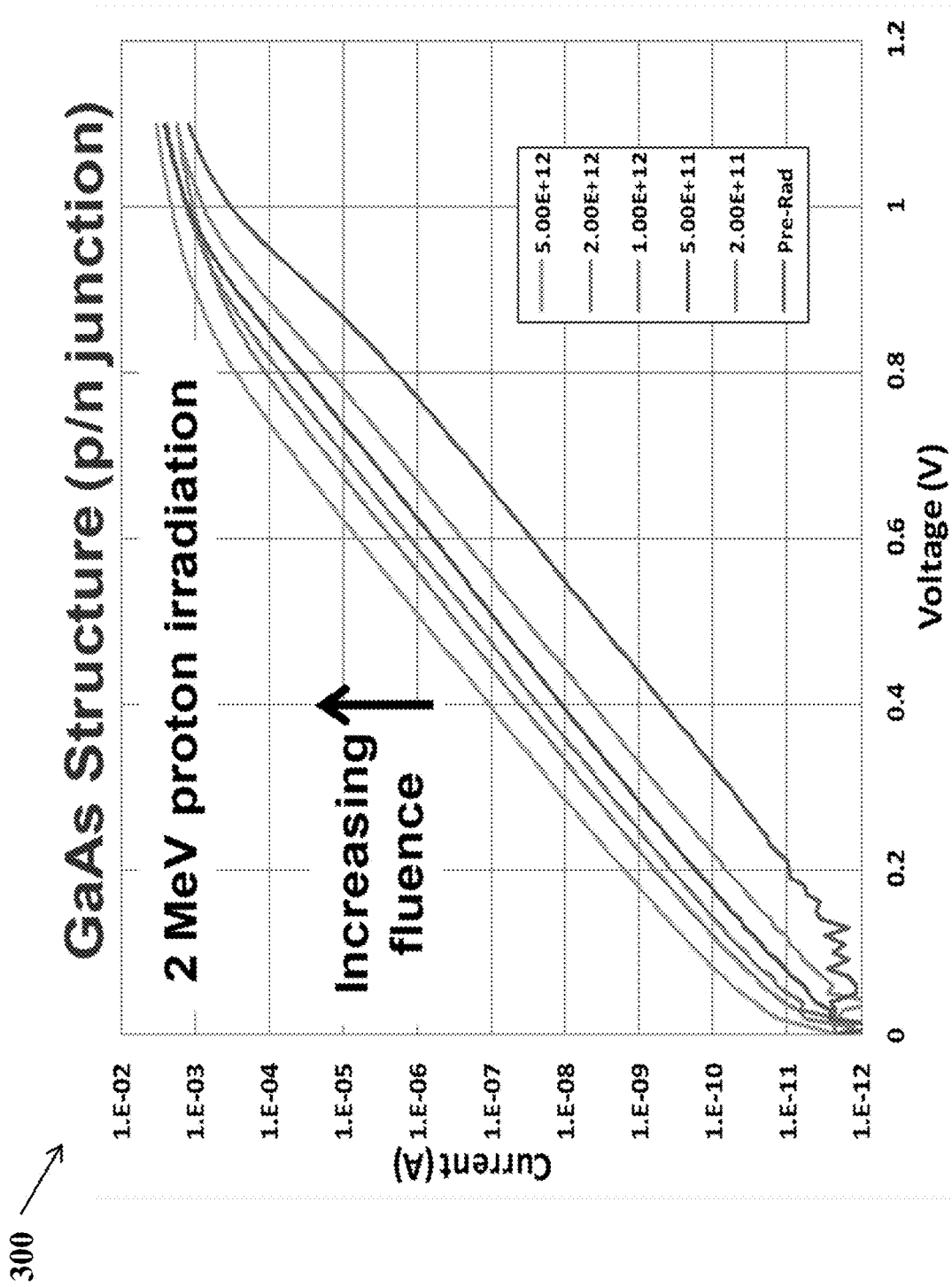
FIG. 3 is a graph that represents forward-biased DIV measurements on a 2 MeV proton irradiated GaAs pn junction diodes in accordance with an exemplary embodiment of the invention.

FIG. 3 is a graph 300 that represents forward-biased DIV measurements on a 2 MeV proton irradiated GaAs pn junction diodes in accordance with an exemplary embodiment of the invention. More specifically, it represents forward-biased dark IV behavior of irradiated pn junction GaAs diodes after irradiation by 2 MeV protons up to a fluence of $5\times10^{12}$ p$^+$/cm$^2$. One of ordinary skill in the art will note that the general trend of the data shows an increase in the dark currents as a function of applied voltage.

Figure 4A:
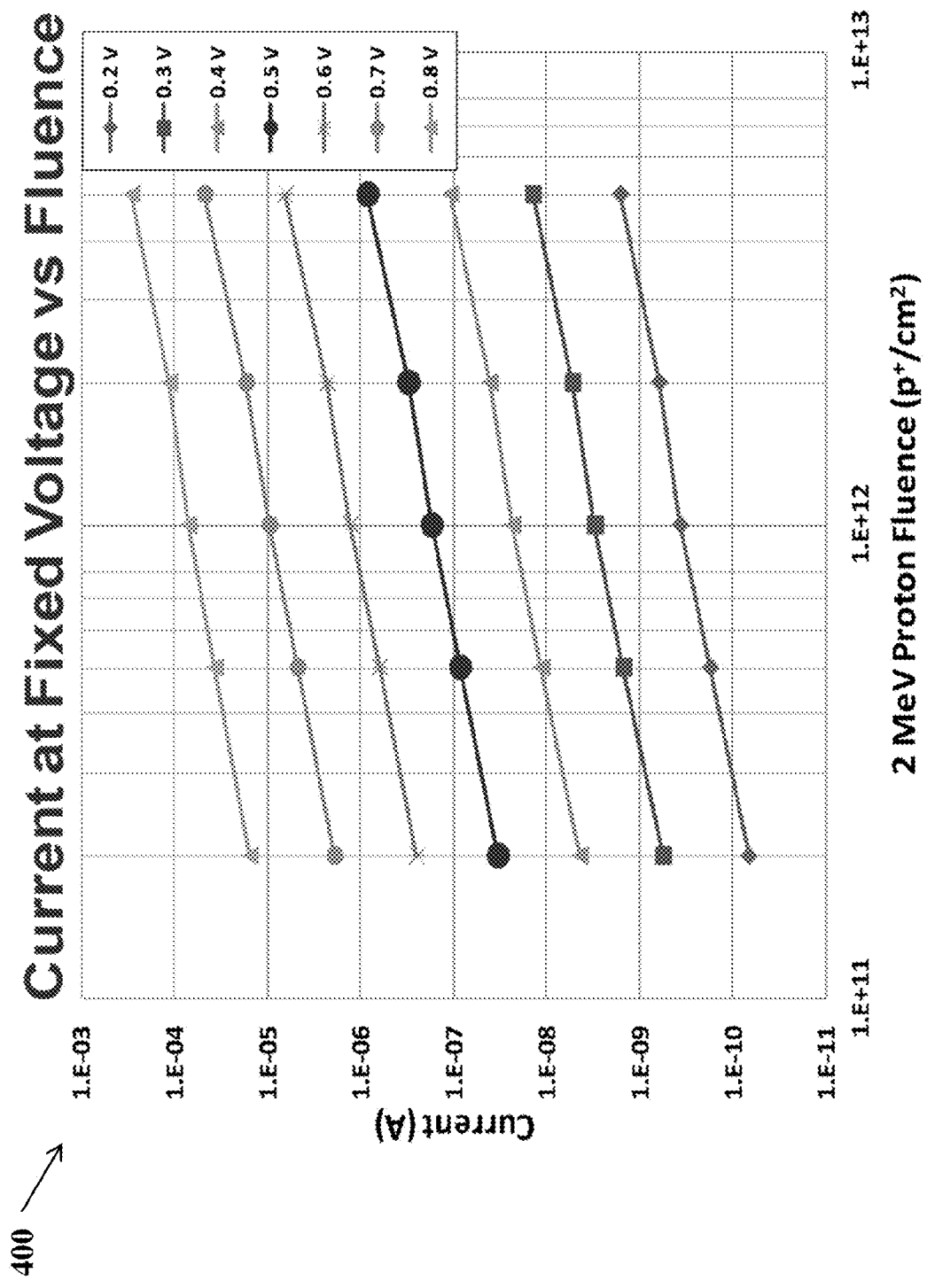
FIG. 4a is a graph that represents the same data plotted as FIG. 3 at fixed voltages as a function of 2 MeV proton fluence, in accordance with an exemplary embodiment of the invention.
Figure 4B:
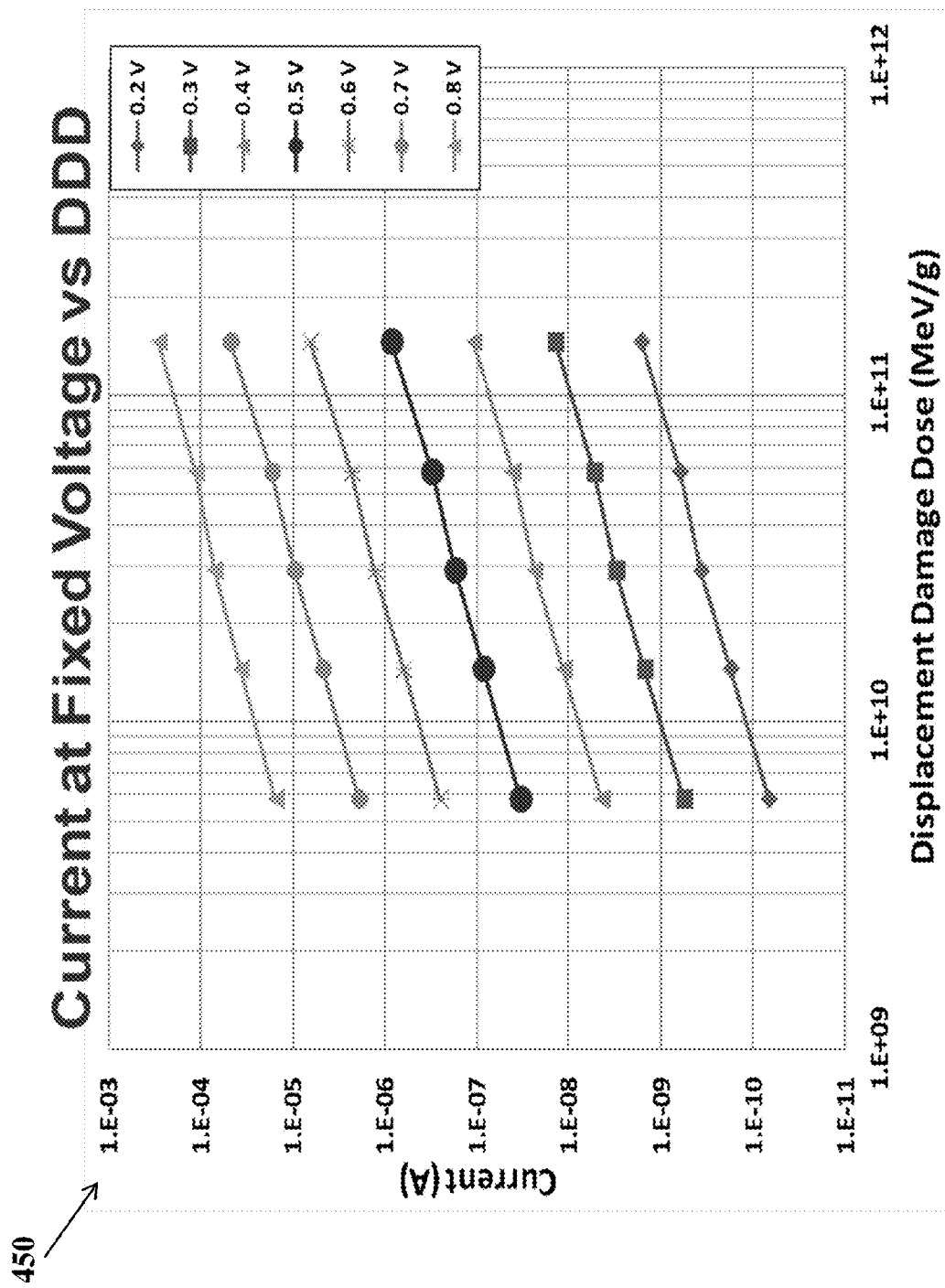
FIG. 4b is a graph that represents the same data plotted as FIG. 3 at fixed voltages as a function of displacement damage dose, in accordance with an exemplary embodiment of the invention.

FIG. 4a is a graph 400 that represents the same data plotted as FIG. 3 at fixed voltages as a function of 2 MeV proton fluence, in accordance with an exemplary embodiment of the invention. FIG. 4b is a graph 450 that represents the same data plotted as FIG. 3 at fixed voltages as a function of displacement damage dose, in accordance with an exemplary embodiment of the invention. One of ordinary skill in the art will understand that there is a noted linear dependence between the proton fluence and displacement damage dose with the dark currents along most of the applied voltages. Therefore, the use of the sensor 100 can provide a correlation of the effects of differing particles as a function of displacement damage dose.

Figure 5:
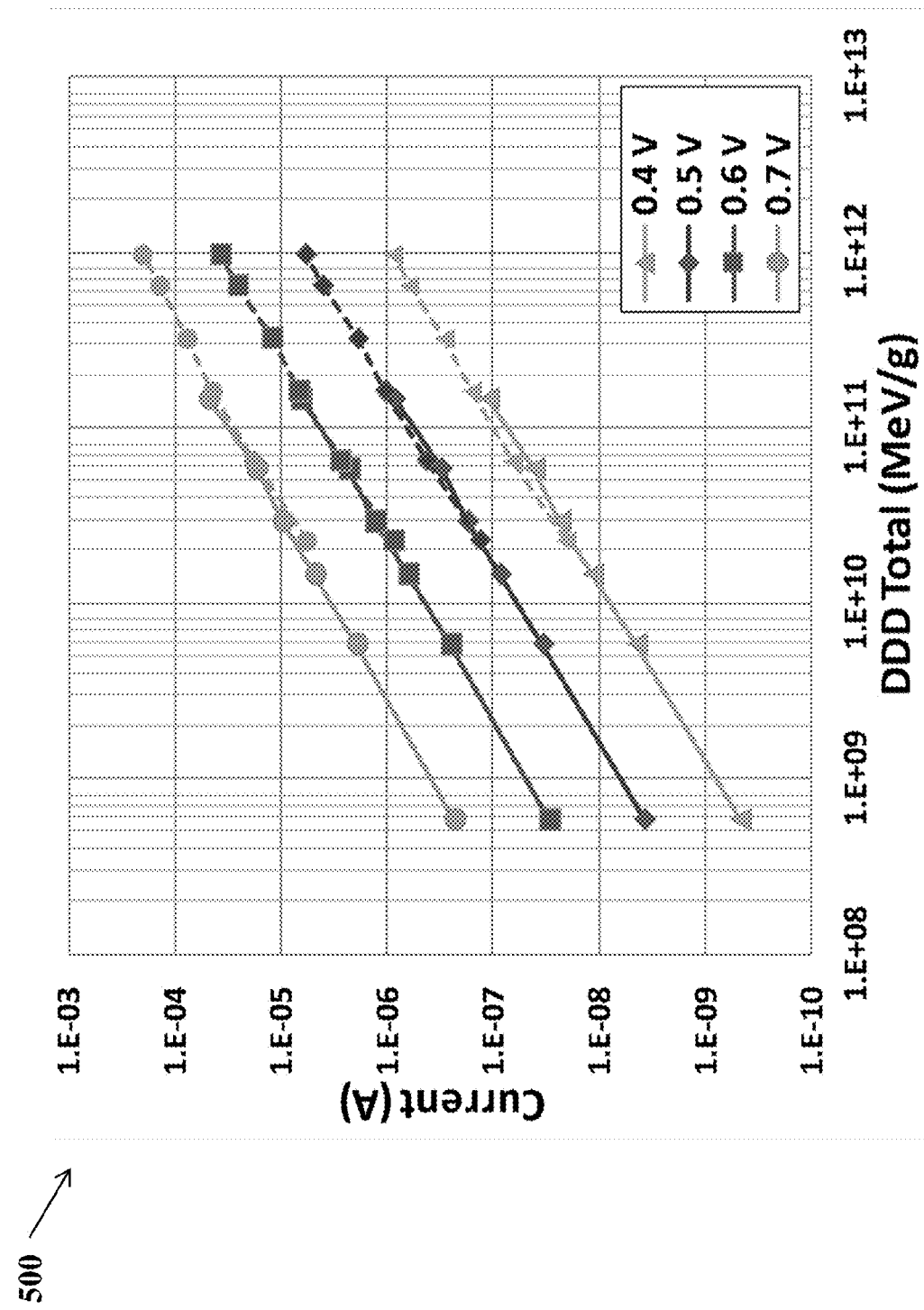
FIG. 5 is a graph that represents the data from FIG. 4b along with an added 225 MeV proton data (dashed lines) as a function of displacement damage dose where the total non-ionizing energy loss (NIEL) used in the data correlation, in accordance with an exemplary embodiment of the invention.

FIG. 5 is a graph 500 that represents the data from FIG. 4b along with an added 225 MeV proton data (dashed lines) as a function of displacement damage dose where the total non-ionizing energy loss (NIEL) used in the data correlation, in accordance with an exemplary embodiment of the invention.

The graph in FIG. 5 demonstrates the development of a characteristic curve for forward-biased DIV behavior for the sensor 100 structure, in accordance with an exemplary embodiment of the invention. That is, the data in FIG. 5 can be used to predict the forward biased DIV behavior for this sensor 100 under irradiation by any energetic proton, or by a spectrum of energetic protons, such as found in a space radiation environment. The knowledge of the characteristic curve, and that of any other sensor 100 structure fabricated, can lead to the determination of the displacement damage dose.

Figure 6:
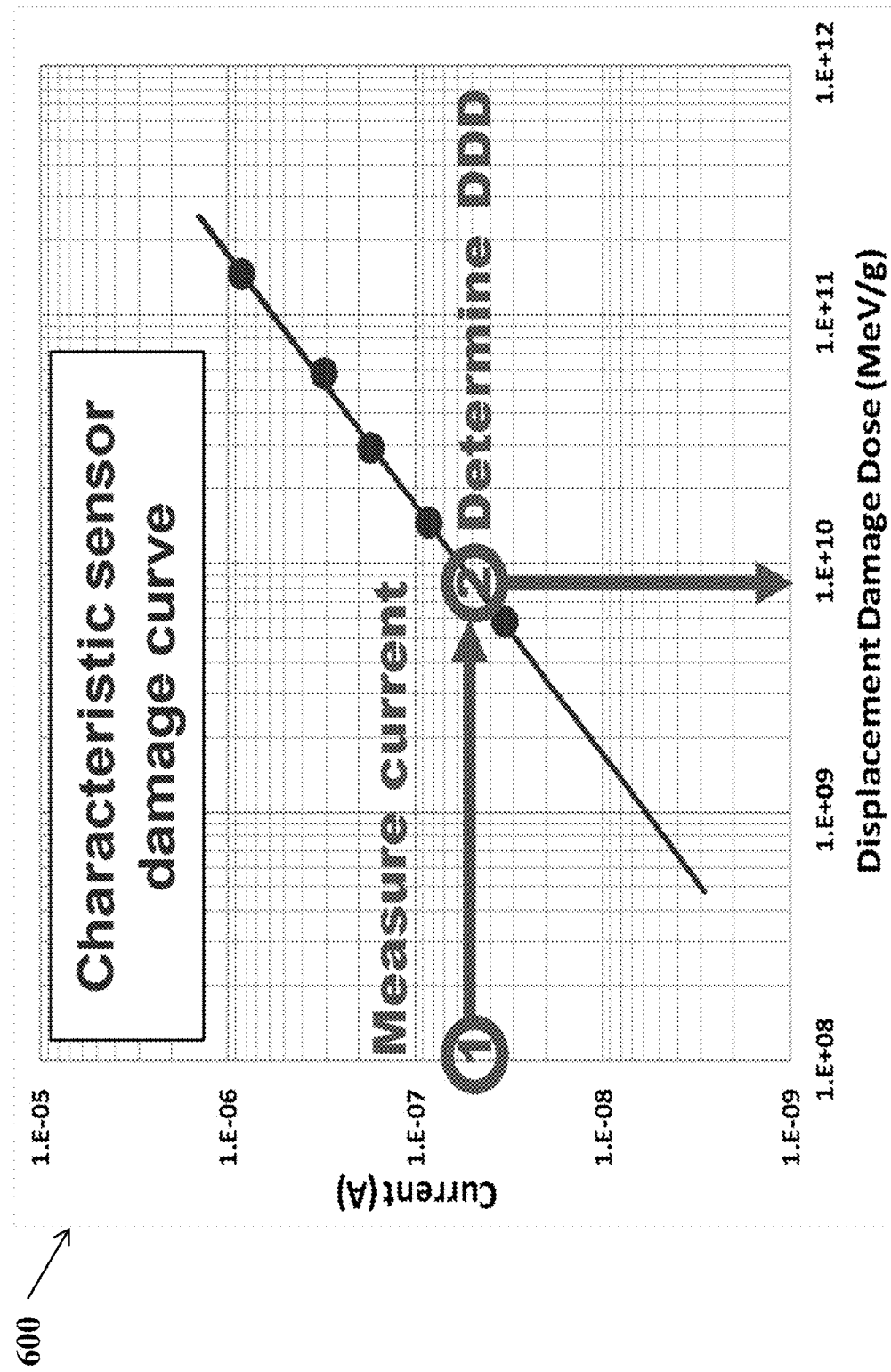
FIG. 6 is a graph that illustrates how to directly determine the displacement damage dose, in accordance with an exemplary embodiment of the invention.

FIG. 6 is a graph 600 that illustrates how to directly determine the displacement damage dose, in accordance with an exemplary embodiment of the invention. As described, the characteristic damage curve can provide a sensor response variable that displays a functional dependence on displacement damage. Therefore, the characteristic damage curve can provide a sensor response variable that is one or more currents measured at one or more fixed voltages. Alternatively, the characteristic damage curve can provide a sensor response variable that is one or more voltages measured at one or more fixed current.

That is, the displacement damage dose absorbed by the sensor 100, the pn junction GaAs diode, can be determined from a simple measurement of the current at a fixed biased voltage as illustrated in FIG. 6. On-orbit, the sensor 100 may be forward-biased at a fixed voltage. The diode current at that voltage can be monitored in real time thereby providing the displacement damage dose directly through knowledge of the characteristic curve behavior. Alternatively, the displacement damage dose absorbed by the sensor 100 can be determined from a simple measurement of the voltage at a fixed current. The sensor 100 has no accompanying calculation to determine the displacement damage dose.

By utilizing one or more shields, shielding the sensor 100 with differing thicknesses can allow for the generation of an on-orbit displacement damage dose depth curve for a given satellite in real time, which, when compared with mission baselines, can allow for an accurate assessment of the state-of-the-mission displacement damage radiation spacecraft operations. If the measured values of the sensor 100 fall below that for the mission baselines, considerations of mission extensions can be offered, while those falling above the baselines would be a possible cause for alert and lead to spacecraft operations to lessen the exposure to radiation.

In short, the sensor 100 is a simple, low expected cost, and low size, weight, and power device, which can measure the displacement damage dose directly, only needing a few ground measurements to generate the calibrated, characteristic degradation curve. Radiation effects from many devices, of which the damage mechanisms are displacement damage related, can also be quantified from the sensor 100 using simple NIEL correlations. The sensor 100 can be utilized for ground- and on-orbit applications.

In an alternative exemplary embodiment of the invention, the sensor 100 can be reverse-biased at a fixed voltage. The reverse-biased DIV behavior of the sensor 100 can show a noted linear relationship with particle fluence instead of damage dose detector, independent of particle energy. When plotted on a graph, this data can then represent a characteristic degradation curve as a function of proton fluence, again independent of proton energy, thereby creating a "fluence" dosimeter. This effect can be a particular use to particle accelerators in determining beam fluences. Typically, the usual methods to determine fluence at beam accelerators employ Faraday cups or ionizing dosimeter films, both of which can obtain suspect results on occasion.

As noted above, the sensor 100 can possess two modes of dosimetry used in the same structure depending on which direction the device is electrically biased. Biasing in the forward direction can enable displacement damage dosimetry, while biasing in the reverse direction can enable particle fluence dosimetry. One of ordinary skill in the art would understand that it can be straightforward to understand the effects of monoenergetic particles on an unshielded sensor 100, such as is usual the case for accelerator beam dosimetry. That is, as long as the characteristic curve is determined for a given sensor 100 structure, the effect of any particle and energy can be inferred by dividing the damage dose detector obtained by the sensor 100 by the NIEL of interest.

However, it can be challenging to determine the displacement damage dose from an energy spectrum of particles through shielding. The typical method for doing this is to perform Monte Carlo simulations of energetic particles through the device shielding, and develop instrument response functions. In this method, the raw data taken by the instruments needs to be mathematically folded with the instrument response functions to obtain meaningful results.

Figure 7:
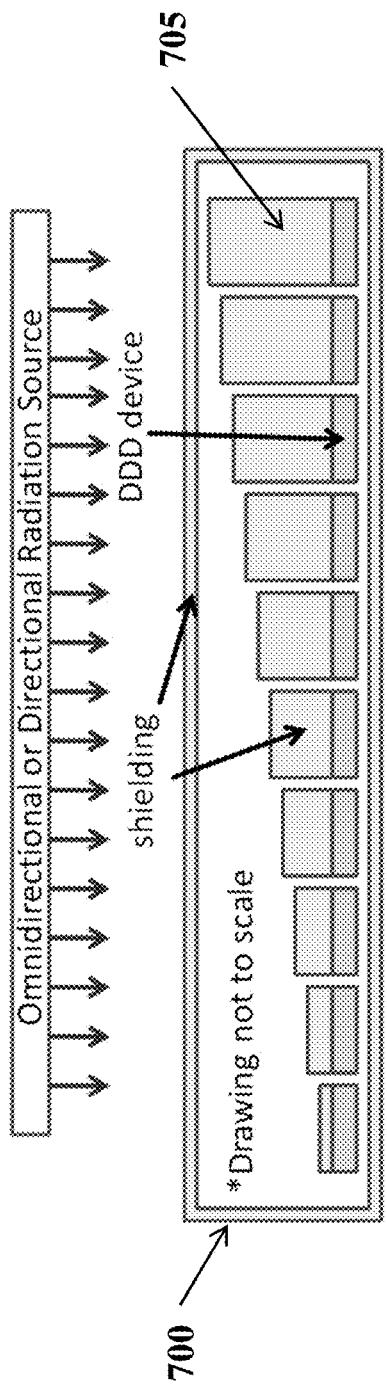
FIG. 7 is a structural diagram of a device, in accordance with an exemplary embodiment of the invention.

This challenge can be addressed by incorporating multiple sensors 100, in a device 700, or device array, each having a different level of shielding. FIG. 7 is a structural diagram of a device 700, in accordance with an exemplary embodiment of the invention. The device 700 can include multiple, individual sensors 100, or damage dose detectors. For the sensor 100 with the thickest shielding 705, i.e., no radiation can reach it; and, therefore, it can provide an internal calibration to adjust for temperature and natural material degradation and/or aging over time. As you move toward the left in the device 700 away from the sensor 100 with the thickest shielding 705, each sensing element 100 can have less shielding material allowing them to absorb more and more of the incident radiation spectrum to damage the device 700. Therefore, the device 700 can effectively bin the incident particle energy spectrum yielding a direct measure of the integrated displacement damage energy spectrum. That is, the configuration of the sensors 100 of the device 700 can be configured to determine the energy spectrum of the radiation environment. The different levels of shielding can also differentiate the impact due to different incident particles (electrons, protons, light ions, neutrons).

Similar to FIG. 7, FIG. 8a is a device array 800 in accordance with an exemplary embodiment of the invention. In the device array 800, the multiple sensors 100 can include one or more shields 805, 810, and 815. As represented in FIG. 8a, the multiple shields 805, 810, and 815 can have varied thickness levels. However, in another embodiment, the multiple shields 805, 810, and 815 could have the same, specific thickness. The shields can be made up of any materials for which there is a known stopping power, or linear energy threshold (LET), of the given material. That is, knowing how thick the material would need to be to stop all radiation or cause displacement damage to the sensor.

As represented in FIG. 7 and FIG. 8a, the shields 805, 810, and 815 can be formed by providing a separate material placed on each of the sensors 100. Furthermore, FIG. 8b is a structural diagram of a stacked device array 850, in accordance with an exemplary embodiment of the invention. In FIG. 8b, multiple device arrays, such as the device array 800 in FIG. 8a, can be stacked on top of each other. Additional types of shielding can be formed in between each of the device arrays 800.

Furthermore, other types of configurations, not represented in the figures, can also be realized. Though not represented in the figures, the shields can by formed by a substrate on each of the sensors, and the shields can be formed by a packaging around the sensors, or around the entire device array. In general, regardless of how the shielding is configured, the shielding thickness can be designed to change the level of displacement damage absorbed by the sensors.

In an exemplary embodiment of the invention, the shielding can be applied directly on the wafer in a chip holder. For example, several processed devices 100 can be adhered to a chip holder. The contact pads of the devices 100 can be wired-bonded to the chip holder, and shielding material of varied thickness can be placed on each sensor 100 mechanically. Shielding materials could also be included on each sensor 100 through a deposition process such as thermal evaporation, or electron beam evaporation. One of ordinary skill in the art will understand that different types of shield materials can be utilized. Monte Carlo particle transport simulations (using MCNPX) can be performed to optimize each configuration. The effects of the chip holder lid can also be addressed as it can impact the final design.

The low size, weight, and power of the sensor 100 can allow it to be integrated either as a device array 700 as illustrated in FIGS. 7, 8 and 8a, or as a stand-alone sensor 100 immediately adjacent to a sensitive space component. For example, the sensor 100 can be mounted directly next to a CMOS imager in the same packaging to get direct measurements of the imager damage. Any differences in the damage responses between the sensor 100 and the CMOS imager could then be identified as another effect, with displacement damage already accounted for through the sensor 100 data.

Furthermore, as described above, many variations on the structural parameters of the embodiment specified in FIG. 1 are possible while maintaining the new features of the sensor 100. The growth parameters of the individual layers can be specified to address many different aspects of the final product with respect to device sensitivity and radiation sensitivity. The possibility of using different material systems such as Silicon or GaN or another material system is also open. Alternate structures may also be considered based on the final application. The sensor 100 can encompass a wide range of devices, radiation sensitivities and material systems.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (processor-executed processes, assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been illustrated and/or described with respect to only one of several implementations; such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

It should be understood that the foregoing relates only to illustrative embodiments of the present invention, and that numerous changes may be made therein without departing from the scope and spirit of the invention as defined by the following claims.

The invention claimed is:

1. A device, comprising one or more sensors that are sensitive to displacement damage, wherein the device is configured to display a characteristic damage curve, and wherein the one or more sensors are comprised of one or more layers of semiconductor material, wherein the one or more layers of semiconductor material comprise an emitter layer and a base layer, wherein each of the one or more layers comprise one or more controls that affect the device performance and the device response to displacement damage, wherein the one or more controls comprise dopant species, doping level, polarity, and layer thickness.

2. The device of claim 1, wherein the one or more sensors are operated in dark illumination conditions.

3. The device of claim 1, wherein the one or more sensors are diodes.

4. The device of claim 1, wherein the characteristic damage curve provides a sensor response variable that correlates to a functional dependence on displacement damage.

5. The device of claim 1, wherein the characteristic damage curve provides a sensor response variable that is one or more currents measured at one or more fixed voltages.

6. The device of claim 1, wherein the characteristic damage curve provides a sensor response variable that is one or more voltages measured at one or more fixed current.

7. The device of claim 1, wherein the one or more sensors comprise one or more shields.

8. The device of claim 7, wherein the one or more shields have a specific thickness.

9. The device of claim 7, wherein the one or more shields have varied thicknesses.

10. The device of claim 7, wherein the one or more shields are formed by providing a separate material placed on each of the one or more sensors.

11. The device of claim 7, wherein the one or more shields are formed by stacking the one or more sensors.

12. The device of claim 7, wherein a shielding thickness is designed to change the level of displacement damage absorbed by the one or more sensors.

13. The device of claim 7, wherein the configuration of the one or more sensors of the device are configured to determine the energy spectrum of the radiation environment.

14. A method, comprising the step of determining a displacement damage dose of a displacement damage dose device based on a characteristic curve of the displacement damage dose device, wherein an energy dependence of the displacement damage dose device response correlates with a nonionizing energy loss of the displacement damage dose device, wherein the displacement damage dose device comprises one or more sensors that are sensitive to displacement damage, wherein the device is configured to display a characteristic damage curve, and wherein the one or more sensors are comprised of one or more layers of semiconductor material, wherein the one or more layers of semiconductor material comprise an emitter layer and a base layer, wherein each of the one or more layers comprise one or more controls that affect the device performance and the device response to displacement damage, wherein the one or more controls comprise dopant species, doping level, polarity, and layer thickness.

15. The method of claim 14, further comprising the step of establishing a characteristic curve for the displacement damage dose device, wherein the step of establishing the characteristic curve for the displacement damage dose device comprises performing ground-based radiation tests.

16. The method of claim 14, wherein the characteristic curve is plotted on a graph with current in units of Amperes on a Y-axis, and displacement damage dose in units of MeV/g on a X-axis.

17. The method of claim 14, wherein the step of determining the displacement damage dose of the displacement damage dose device based on the characteristic curve comprises the step of measuring a current at a fixed forward biased voltage on the characteristic curve.

18. The method of claim 14, wherein the step of determining the displacement damage dose of the displacement damage dose device based on the characteristic curve comprises the step of measuring a voltage at a fixed current on the characteristic curve.

* * * * *